(12) United States Patent
Cohen et al.

(10) Patent No.: US 8,520,022 B1
(45) Date of Patent: Aug. 27, 2013

(54) METHOD AND SYSTEM FOR IMPROVING SCREEN READABILITY IN DAYLIGHT WITH RUNTIME COLOR ADJUSTMENT

(71) Applicant: Google Inc., Mountain View, CA (US)

(72) Inventors: Gabriel Cohen, Alameda, CA (US); Michael A. Cleron, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/658,911

(22) Filed: Oct. 24, 2012

(51) Int. Cl.
| | |
|---|---|
| G09G 3/16 | (2006.01) |
| G09G 3/30 | (2006.01) |
| G09G 5/00 | (2006.01) |
| G09G 5/02 | (2006.01) |
| H04N 5/57 | (2006.01) |
| H04N 9/73 | (2006.01) |
| H04N 9/12 | (2006.01) |
| H04N 1/46 | (2006.01) |
| G06K 9/00 | (2006.01) |
| G06K 9/40 | (2006.01) |
| G06K 9/20 | (2006.01) |

(52) U.S. Cl.
USPC ........... 345/589; 345/48; 345/77; 345/590; 345/593; 345/690; 348/602; 348/655; 348/687; 348/739; 358/509; 358/516; 382/167; 382/254; 382/274; 382/312

(58) Field of Classification Search
USPC ......... 345/581, 589–590, 593–594, 600–601, 345/611, 619, 647, 204, 207, 690, 36, 39, 345/48, 63, 77, 84; 348/68, 602–603, 630, 348/655, 658, 687, 708, 739, 759–762; 349/69–70, 72; 358/509, 504, 516, 518–520, 358/447–448, 480; 382/162, 167, 254, 269, 382/274, 276, 312
See application file for complete search history.

(56) References Cited

U.S. PATENT DOCUMENTS

| | | | |
|---|---|---|---|
| 6,809,741 B1 | 10/2004 | Bates et al. | |
| 7,049,575 B2 | 5/2006 | Hotelling | |
| 7,446,303 B2 | 11/2008 | Maniam et al. | |
| 7,597,447 B2 | 10/2009 | Larson et al. | |
| 8,159,503 B2 | 4/2012 | Park | |
| 2003/0103141 A1* | 6/2003 | Bechtel et al. | 348/148 |
| 2007/0035707 A1* | 2/2007 | Margulis | 353/122 |
| 2008/0267467 A1* | 10/2008 | Sokulin et al. | 382/128 |
| 2009/0109129 A1* | 4/2009 | Cheong et al. | 345/20 |
| 2011/0050719 A1 | 3/2011 | Diefenbaugh et al. | |
| 2011/0074803 A1* | 3/2011 | Kerofsky | 345/589 |
| 2011/0205397 A1* | 8/2011 | Hahn et al. | 348/231.6 |
| 2012/0019152 A1 | 1/2012 | Barnhoefer et al. | |

(Continued)

*Primary Examiner* — Wesner Sajous
(74) *Attorney, Agent, or Firm* — McDonnell Boehnen Hulbert & Berghoff LLP (57) ABSTRACT

Display functions in an electronic device may comprise combining runtime color adjustments with brightness adjustments triggered by ambient light detection. Light sensors may be utilized to detect ambient lighting conditions, which may cause adjustment of brightness level applicable to a display (or screen) of the electronic device. The adjustment of brightness level may then be combined with adjustment of contrast level that may also be applicable to display functions. In this regard, a particular contrast level may be selected based on the detected ambient lighting conditions—e.g., by mapping various contrast levels to preconfigured ambient lighting levels. The contrast adjustment may comprise adjusting colors and/or sharpness. Using contrast adjustments, in conjunction with the brightness adjustments, may allow for achieving the same levels of readability with less brightness, and/or for increased readability with the same brightness.

30 Claims, 4 Drawing Sheets

(56) References Cited

U.S. PATENT DOCUMENTS

2012/0019492 A1    1/2012   Barnhoefer et al.
2012/0050566 A1*   3/2012   Cote et al. .................. 348/224.1
2012/0182276 A1*   7/2012   Kee .............................. 345/207
2012/0327139 A1*  12/2012   Margulis ....................... 345/690

* cited by examiner

METHOD AND SYSTEM FOR IMPROVING SCREEN READABILITY IN DAYLIGHT WITH RUNTIME COLOR ADJUSTMENT

TECHNICAL FIELD

Aspects of the present application relate to electronic devices. More specifically, certain implementations of the present disclosure relate to improving screen readability in daylight with runtime color adjustment.

BACKGROUND

Various devices can be used nowadays in displaying video content, which may comprise still or moving images, and/or text (in some instances). Such video display devices may comprise dedicated display devices, such as televisions (TVs), and/or devices with secondary display capabilities, such as smartphones, tablets, laptops, desktops, or industrial (or medical) devices with display screen for outputting data. The video display devices may display video content comprising locally generated content, content obtained from local or auxiliary sources, and/or content obtained from remote sources. In this regard, locally obtained video content may comprise content read from storage means, such as video content that may have been previously stored into Digital Video Discs (DVDs) and/or Blu-ray discs, and subsequently read therefrom using corresponding player devices, such as stand-alone DVD or Blu-ray players and/or optical disc drives (ODDs) integrated into or coupled to video display devices. Video content obtained from remote sources may comprise content communicated and received via television broadcasts and/or broadband (e.g., Internet) telecasts or streams. Furthermore, in addition to video content obtained from remote or local sources, displayed video content may comprise content generated within or by the devices, such as video content corresponding to applications or programs executed by or on the devices. Additionally (or alternatively), content may be associated with use of interactive interfaces, such as with use of computers, smartphones, and/or game-console/video games, and as such the video content may be interactively generated. In some instances, video display devices may be used to concurrently display multiple video contents.

Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY OF THE DISCLOSURE

A system and/or method is provided for improving screen readability in daylight with runtime color adjustment, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION OF THE DISCLOSURE

The present disclosure relates to a method and system for improving screen readability in daylight with runtime color adjustment. In various implementations, ambient lighting conditions may be determined in an electronic device, and a contrast adjustment may be selected based on the determined ambient lighting conditions. The selected contrast adjustment may then be applied, in combination with a particular brightness level applicable to a display of the electronic device, to video content outputted via the display. The applicable brightness level may also be selected based on the determined ambient lighting conditions. In some instances, the contrast adjustment may be selected based on the applicable brightness level. The contrast adjustment may comprise color and/or sharpness adjustment. The selected contrast adjustment may be applied during graphics and/or video processing performed in the electronic device during display operations, and/or during generation and/or creation of the video content. In this regard, applying the selected contrast adjustment during generation and/or creation of the video content may comprise adjusting text color selection. Graphics and/or video processing performed in the electronic device during display operations may be adjusted based on the contrast adjustment. In this regard, the configuring of graphics and/or video processing operations may comprise adjusting distortion related processing to account for changes caused by the contrast adjustment. The distortion related processing comprises anti-aliasing processing.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "e.g." or "for example" introduces or follows a list of one or more non-limiting examples, instances, or illustrations.

Figure 1:
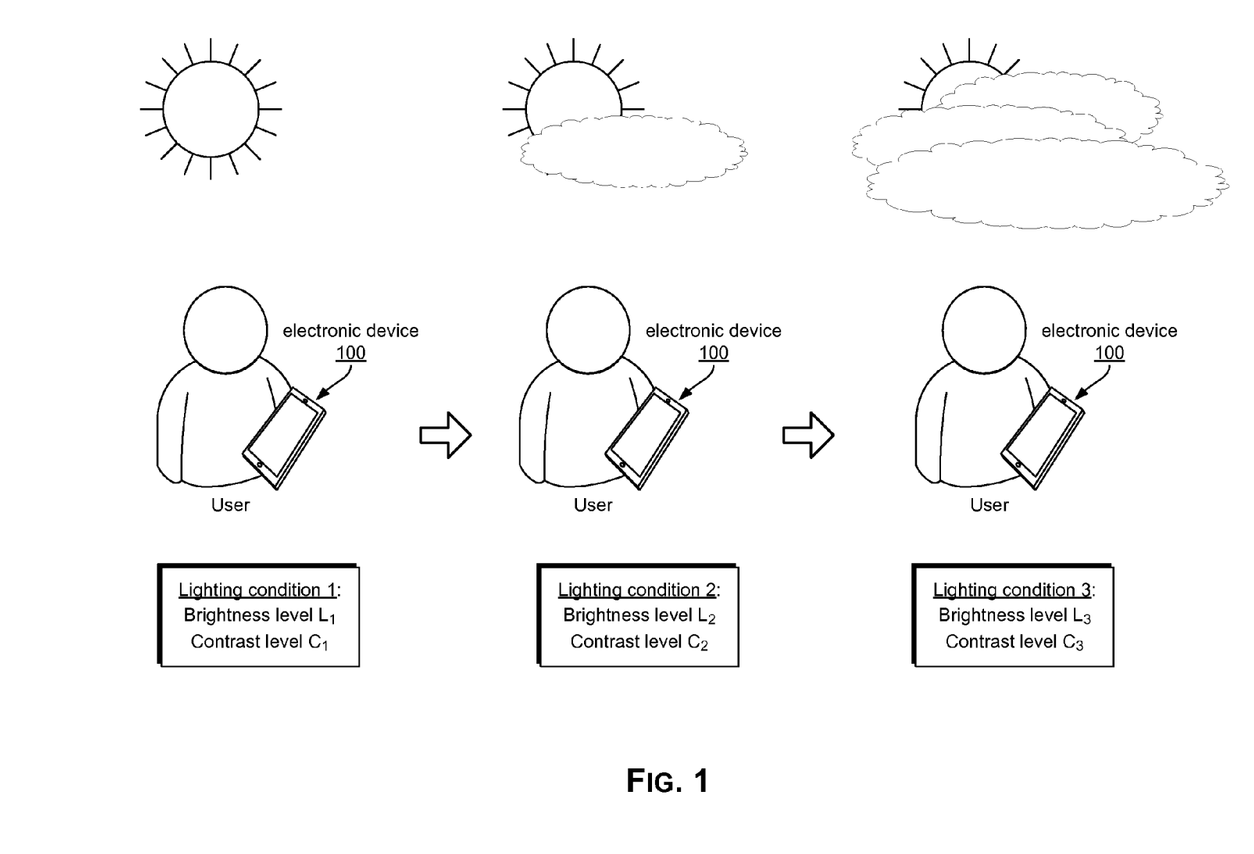
FIG. 1 is a block diagram illustrating an electronic device that may be used in display video content in settings where it may be subject to different lighting conditions.

FIG. 1 is a block diagram illustrating an electronic device that may be used in display video content in settings where it may be subject to different lighting conditions. Referring to FIG. 1 there is shown an electronic device 100.

The electronic device 100 may comprise suitable logic, circuitry, interfaces, and/or code that may be operable to perform various functions or operations, and/or run various applications and/or programs. In this regard, operations, functions, applications and/or programs supported by the electronic device 100 may be performed, executed and/or run based on user instructions and/or pre-configured instructions. In some instances, the electronic device 100 may support communication of data, via wired and/or wireless connections, in accordance with one or more supported wireless and/or wired protocols or standards. The electronic device 100 may be readily moved, such as when a user of the electronic device 100 is moving, and the electronic device 100 may support operations on the move. In some instances, the electronic device 100 may be a mobile device—i.e., be intended for use on the move and/or at different locations. Examples of electronic devices may comprise cellular phones (including smartphones), tablets, laptop computers, desktop or personal computers, televisions, personal media players, and/or other similar devices. The disclosure, however, is not limited to any particular type of electronic devices.

In operation, the electronic device 100 may be utilized (e.g., by its user) to perform, execute, or run various tasks and/or applications. In this regard, some of the tasks and/or applications performed, executed, or run by the electronic device 100 may be done on the move—i.e., at different locations. In some instances, the electronic device 100 may be utilized to display video content. In this regard, the video content may comprise still and/or moving (i.e., a stream of) images, and/or graphics (including, e.g., images, icons, text, etc.). The video content and/or graphics may comprise or correspond to input data read from storage device(s) or received via broadcast or transmission to the electronic device; user interaction data, such as use menus or other graphic user interface (GUI) like functions; control related information, such as status or error related data; and/or data generated by and/or in conjunction with applications or programs run or executed by or on the electronic devices.

In some instances, the electronic device 100 may be exposed to variations in ambient lighting conditions. These variations in ambient lighting conditions may be caused by environmental factors (e.g., due to increased/decrease in cloud cover, or due to variations in position of the sun relative to the device—since the sun may be at different positions in the sky at different times in the day and/or the year), and/or may be attributed to conditions relating to use of the device (e.g., change of location or positioning of the electronic device 100, such as when the electronic device 100 is a mobile device that is being moved and/or rotated by its user(s)). The changes in ambient lighting conditions may impact certain operations and/or functions in the electronic device 100, including display operations, for example. In this regard, changes in ambient lighting conditions may affect readability of any display (screen) of the electronic device 100 that may be utilized during display operations. For example, reading and/or viewing text or graphics displayed via a screen of an electronic device (e.g., smartphone or tablet) may be very hard in direct sunlight.

In some instances, some of the effects of changes in the ambient lighting conditions may be remedied by adjusting brightness levels. In this regard, the brightness level, applicable to the display or the screen of the electronic device 100 for example, may be adjusted to account for some of the changes to display readability resulting from changes in ambient lighting conditions (e.g., worsening display readability resulting from transitioning from a shaded area into direct sunlight). Such adjustments in applicable brightness levels may be done manually—e.g., by the device user(s) manually adjusting the display brightness, using some brightness adjustment function in the device (on-screen menu). Alternatively, in some instances, adjustments to applicable brightness levels may be done automatically. In this regard, once ambient lighting level is determined (e.g., detected via a light sensor), a corresponding brightness level may be selected and applied automatically to the display. The selection of the applicable brightness level may be based on mapping of applicable brightness levels to corresponding ambient lighting levels, such as using a pre-configured table of pre-selected screen brightness settings corresponding to particular ambient lighting levels (as shown in example table 1), with each brightness level at each ambient lighting level being set to, for example, the minimum required brightness needed to make the device display readable at the corresponding ambient light level:

EXAMPLE TABLE 1

| ambient lighting/brightness mapping | |
|---|---|
| Ambient Light Level (0 to 100) | Brightness Level (0 to 100) |
| 0 | 10 |
| 25 | 25 |
| 50 | 50 |
| 75 | 75 |
| 100 | 90 |

Adjustments of brightness alone, however, may not be sufficient in some instances. In this regard, in some ambient lighting conditions (e.g., in direct sunlight, at noon), even highest quality screens may be difficult to read, even at the maximum screen brightness level. In addition, even where minimum readability may be achieved by increasing display brightness (e.g., to the maximum applicable level), applying high brightness levels may be undesirable since it may adversely affect certain resources in the electronic devices, such as the battery—i.e., running display operations at high/maximum brightness level may reduce battery life at faster than desired rates. Another consideration is that while brightness adjustment is applied uniformly to all content displayed on the device screen, changes in ambient lighting conditions may actually impact applications running in the device differently—i.e., some applications may be worse than others in similar ambient lighting conditions, such as when graphics generated by and/or relating to these applications may themselves not particularly have high contrast, and thus may appear more washed out and difficult to read in daylight, even at maximum brightness level.

Accordingly, in various implementations of the disclosure, contrast applicable to display operations may be adjusted based on changes in ambient lighting conditions, to remedy at least some of the effects of these changes in ambient lighting conditions. The contrast adjustments may be combined with adjustments to brightness levels, applicable to the display or the screen of the electronic devices for example, to further enhance readability of the screen. In this regard, contrast adjustments may be introduced as a second adjustment, in addition to and/or in combination with the brightness adjustment, with combinations of both of these adjustments being mapped onto corresponding ambient light levels. Thus, both contrast and brightness adjustments may be selected based on detection of ambient lighting levels. Furthermore, while the contrast parameter (or adjustment thereto) may be specified as a single value for each ambient lighting level, the contrast may be applied variably to different applications or functions generating video content. In this regard, since contrast may be applied as part of video processing or video generation operations, the specified contrast may be adaptively applied to each application.

The selection of the applicable brightness level may be based on mapping of contrast and brightness levels to corresponding ambient lighting levels, such as using a table of pre-selected screen brightness settings and contrasts applicable to various ambient light levels (as shown in example table 2):

EXAMPLE TABLE 2 ambient lighting/brightness and contrast mapping

| Ambient Light Level (0-100) | Brightness Level (0-100) | Contrast (1.00-1.50) |
|---|---|---|
| 0 | 10 | 1.00 |
| 25 | 25 | 1.00 |
| 50 | 50 | 1.10 |
| 75 | 75 | 1.25 |
| 100 | 90 | 1.25 |

In some implementations, contrast adjustments may be varied adaptively, such that to allow for varying corresponding brightness adjustments in the same lighting conditions—e.g., applying higher contrast in combination with lower brightness to achieve the same readability at a particular ambient lighting condition. In other words, the mapping of the detected ambient lighting level to the brightness/contrast adjustment may be configured such that similar levels of readability may be achieved with less brightness by using higher contrast for example, and/or to achieve increased readability when brightness is set at a maximum level. Enhancing readability at the same lighting conditions with lower brightness levels may be desirable because brightness adjustment tends to be more power consuming than contrast adjustment. For example, shown in example table 3, below, similar readability may be achieved at each of the ambient lighting levels, compared to the previous table (example table 2) by applying higher contrasts with lower brightness levels, compared to the previous table:

EXAMPLE TABLE 3 adaptive ambient lighting, brightness/contrast mapping

| Ambient Light Level (0-100) | Brightness Level (0-100) | Contrast (1.00-1.50) |
|---|---|---|
| 0 | 10 | 1.00 |
| 25 | 20 | 1.20 |
| 50 | 40 | 1.30 |
| 75 | 60 | 1.40 |
| 100 | 80 | 1.50 |

Figure 2:
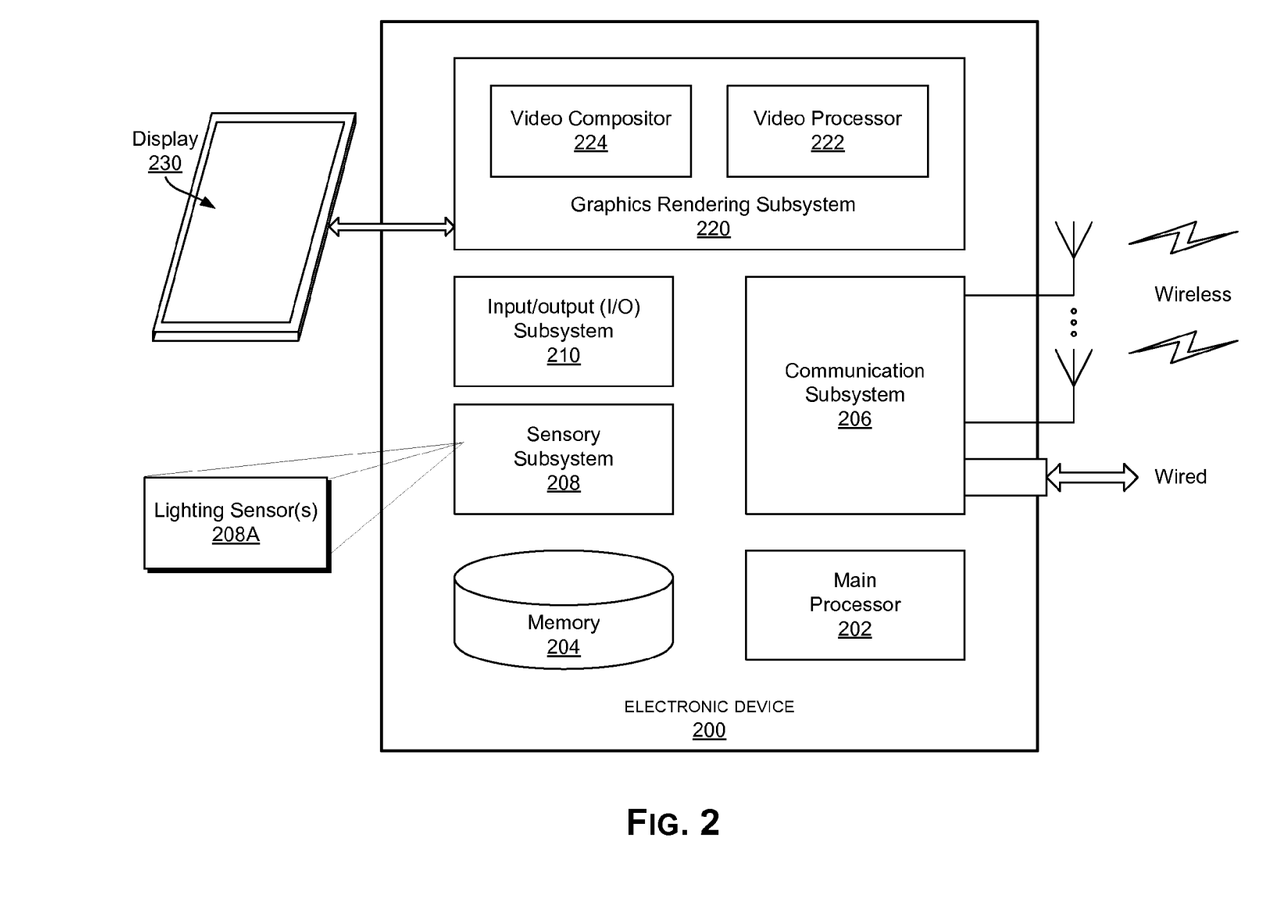
FIG. 2 is a block diagram illustrating an electronic device that supports adaptive contrast adjustments based on variations in ambient lighting conditions.

FIG. 2 is a block diagram illustrating an electronic device that supports adaptive contrast adjustments based on variations in ambient lighting conditions. Referring to FIG. 2, there is shown an electronic device 200. The electronic device 200 may comprise suitable logic, circuitry, interfaces, and/or code that may be operable to implement various aspects of the disclosure. In this regard, the electronic device 200 may correspond to the electronic device 100 of FIG. 1, for example. The electronic device 200 may comprise, for example, a main processor 202, a system memory 204, a communication subsystem 206, a sensory and input/output (I/O) subsystem 208, an input/output (I/O) subsystem 210, a graphics rendering subsystem 220, and a display 230.

The main processor 202 may comprise suitable logic, circuitry, interfaces, and/or code that may be operable to process data, and/or control and/or manage operations of the electronic device 200, and/or tasks and/or applications performed therein. In this regard, the main processor 202 may configure and/or control operations of various components and/or subsystems of the electronic device 200, by utilizing, for example, one or more control signals. The main processor 202 may enable running and/or execution of applications, programs and/or code, which may be stored, for example, in the system memory 204. Alternatively, one or more dedicated application processors may be utilized for running and/or executing applications (or programs) in the electronic device 200. In some instances, some of the applications running and/or executing on the electronic device 200 may generate and/or update video content that may be rendered via the display 230.

The system memory 204 may comprise suitable logic, circuitry, interfaces, and/or code that may enable permanent and/or non-permanent storage, buffering, and/or fetching of data, code and/or other information, which may be used, consumed, and/or processed. In this regard, the system memory 204 may comprise different memory technologies, including, for example, read-only memory (ROM), random access memory (RAM), Flash memory, solid-state drive (SSD), and/or field-programmable gate array (FPGA). The system memory 204 may store, for example, configuration data, which may comprise parameters and/or code, comprising software and/or firmware.

The communication subsystem 206 may comprise suitable logic, circuitry, interfaces, and/or code operable to communicate data from and/or to the electronic device, such as via one or more wired and/or wireless connections. The communication subsystem 206 may be configured to support one or more wired protocols (e.g. Ethernet standards) and/or wireless protocols or interfaces (e.g., Bluetooth, WiFi, cellular, WiMAX, and/or any available wireless protocol/interface), facilitating transmission and/or reception of signals to and/or from the electronic device 200, and/or processing of transmitted or received signals in accordance with applicable wired or wireless protocols. In this regard, signal processing operations may comprise, for example, filtering, amplification, analog-to-digital conversion and/or digital-to-analog conversion, up-conversion/down-conversion of baseband signals, encoding/decoding, encryption/decryption, and/or modulation/demodulation.

The sensory subsystem 208 may comprise suitable logic, circuitry, interfaces, and/or code for obtaining and/or generating sensory information, which may relate to the electronic device 200, its user(s), and/or its environment. For example, the sensory and I/O subsystem 208 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters). The sensory subsystem 208 may comprise, for example, am ambient lighting sensor 208A, which may comprise suitable logic, circuitry, interfaces, and/or code for detecting ambient lighting conditions. In some instances, the sensory subsystem 208 may be operable to translate the detected ambient lighting conditions into corresponding ambient lighting levels, which may be used in adjusting display operations, such as by selecting applicable brightness and/or contrasts adjustments corresponding to the ambient lighting levels.

The I/O subsystem 210 may comprise suitable logic, circuitry, interfaces, and/or code for enabling and/or managing user interactions with the electronic device 200, such as obtaining input from, and/or to providing output to, the device user(s). The I/O subsystem 210 may support various types of inputs and/or outputs, including, for example, video, audio, and/or textual. In this regard, dedicated I/O devices and/or components, external to or integrated within the electronic device 200, may be utilized for inputting and/or outputting data during operations of the I/O subsystem 210. Examples of such dedicated I/O devices may comprise displays, mice, keyboards, touchscreens, and the like. With respect to video input/output, the I/O subsystem 210 may be operable to control and/or manage generation and/or handling of video content, graphics, and/or textual data, outputted or inputted via the display 230 for example. In this regard, the graphics rendering subsystem 220 may be utilized for performing necessary video processing operations, to facilitate generating video frames, based on outputted video content, displayed via the display 230, and/or for extracting or obtaining input data corresponding to user interactions with the display 230 (e.g., touching or swiping in particular region(s) of the display 230).

The graphics rendering subsystem 220 may comprise suitable logic, circuitry, interfaces and/or code that may enable generating and/or processing of video content, and/or generating video frames based thereon for display, via the display 230 for example. The graphics rendering subsystem 220 may be implemented, for example, utilizing pipeline based architecture. In some instances, the graphics rendering subsystem 220 may support adaptive contrast/brightness adjustments, substantially as described with respect to FIG. 1. For example, the graphics rendering subsystem 220 may comprise, for example, a video processor 222 and a video compositor 224.

The video processor 222 may comprise suitable logic, circuitry, interfaces and/or code that may be operable to perform video processing operations on input video data (or content), to facilitate generation of corresponding output video data, which may be played via, for example, the display 230. For example, the video processor 222 may be operable to perform de-noising, de-blocking, restoration, deinterlacing and/or video sampling. In some instances, the video processor 222 may also perform decoding and/or decompression, such as when the input video data is received in encoded and/or compressed format. This may be achieved directly via the video processor 222 and/or via separate, dedicated video decoder component. The video compositor 224 may comprise suitable logic, circuitry, interfaces and/or code that may be operable to generate output video data (frames) for display based on video content received, handled, and/or processed via the graphics rendering subsystem 310. The video compositor 224 may also perform additional video processing operations, to ensure that generated output video steams may be formatted to suit the display 230. In this regard, the video compositor 224 may be operable to perform, for example, motion estimation and/or compensation, frame up/down-conversion, cropping, and/or scaling. In some instances, the video compositor 224 may be operable to generate and/or configure display frames that correspond to multi-window display operations. In this regard, the video compositor 224 may be operable to combine video contents corresponding to a plurality of display regions into single display frames.

The display 230 may comprise suitable logic, circuitry, interfaces and/or code that may enable displaying of video content, which may be handled and/or processed via the I/O subsystem 210 and/or the graphics rendering subsystem 220. In some instances, the display 230 may also allow for user interactions, such as to obtain user input. For example, the display 230 may allow for display of particular regions where the device user(s) may enter input, such as by touching (e.g., "clicking" buttons), swiping, and/or typing.

In operation, the electronic device 200 may be utilized to display video content, via the display 230. In this regard, the video content may comprise still and/or moving (stream of) images, and/or graphics (including, e.g., text, images, icons, etc.). The video content and/or graphics may comprise or correspond to input data read from storage device(s) or received via broadcast or transmission to the electronic device; user interaction data, such as use menus or other graphic user interface (GUI) like functions; control related information, such as status or error related data; and/or data generated by and/or in conjunction with applications or programs run or executed by or on the electronic devices. In some instances, the electronic device 200 may be exposed to variations in ambient lighting conditions. The changes in ambient lighting conditions may impact certain operations and/or functions in the electronic device 200, including display operations. In this regard, changes in ambient lighting conditions may affect readability of the display 230 of the electronic device 200. For example, reading and/or viewing text or graphics displayed via a screen of an electronic device (e.g., smartphone or tablet) may be very hard in direct sunlight.

In various implementations, contrast and brightness applicable to display operations in the electronic device 200 may be adjusted based on detected changes in ambient lighting conditions—e.g., using ambient lighting sensor 208A—to remedy and/or compensate for at least some of the effects of these changes in ambient lighting conditions. In this regard, the contrast (or adjustments thereto) may be combined with brightness levels (or changes thereto), applicable to the display 230, to optimize readability of the display 230 at each ambient lighting level. For example, the applicable contrast and brightness may be selected automatically, based on pre-configured mapping of contrast/brightness adjustment onto corresponding ambient light levels, using tables such as example table 2 and/or example table 3 in connection with the environments of FIG. 1, for example. In this regard, the contrast and brightness configurations and/or adjustments may be performed based on detection of ambient lighting levels, whereby the applicable brightness and contrast levels may be selected based on the detected ambient level(s).

The contrast adjustments may comprise adjusting the display colors—e.g., for additional contrast, and/or adjusting sharpness. In some implementations, the color adjustments may be implemented by adding a color filtering component in the graphics rendering subsystem 220, which may apply a global contrast value. In this regard, the filtering component may be a straightforward mathematical filter that can be inserted into the graphics rendering subsystem 220 while maintaining other aspects (e.g., frame rate) of the display and/or video processing functions unchanged. The contrast adjustments may also be applied by other means, such as by adjusting the video content generation processes and/or functions. For example, rather than adjusting colors during video processing, modifying contrast levels (due to changes in ambient lighting levels) may trigger adjustments of colors directly in and/or by the applications generating the video contents (e.g., changing text colors specified by the applications).

In some instances, because contrast adjustments may affect other video processing operations, video processing functions in the electronic device 200 may be adjusted and/or added to account for and/or compensate for the contrast adjustments. For example, because increasing contrast may cause some added artifacts (e.g., aliasing), the video processing functions in the graphics rendering subsystem 220 may be modified to account for these changes. Thus, to account for any increases in apparent aliasing, contrast adjustment may be performed within the graphics rendering subsystem 220 before anti-aliasing is performed, and/or anti-aliasing may be performed if not done originally to compensate for the contrast adjustment based aliasing effects.

In an implementation, user interactions (e.g., input) may be used in controlling and/or modifying automatic contrast and/or brightness adjustments in the electronic device 200. In this regard, user input may be obtained, such as via the I/O subsystem 210, and may be used to configure at least some of the functions and/or operations performed during automatic contrast and/or brightness adjustments. For example, the user input may specify that such automatic adjustments may be turned on or off—i.e., it may allow the device user to turn off one or more of the brightness and contrast adjustments, and/or to turn them back on. In other instances, the user input may vary parameters and/or criteria that affect and/or pertain to the contrast and/or brightness adjustment. For example, user input applicable to the automatic contrast and/or brightness may be used to specify pertinent user preferences (e.g., reducing battery use vs. maximizing display readability). In this regards, specifying maximizing display readability may cause larger adjustments in brightness and/or contrasts when ambient lighting conditions reduce readability, whereas specifying optimized battery use may cause stronger emphasis on achieving enhanced display readability by use of contrast adjustment in lieu of brightness adjustments (where possible).

Figure 3A:
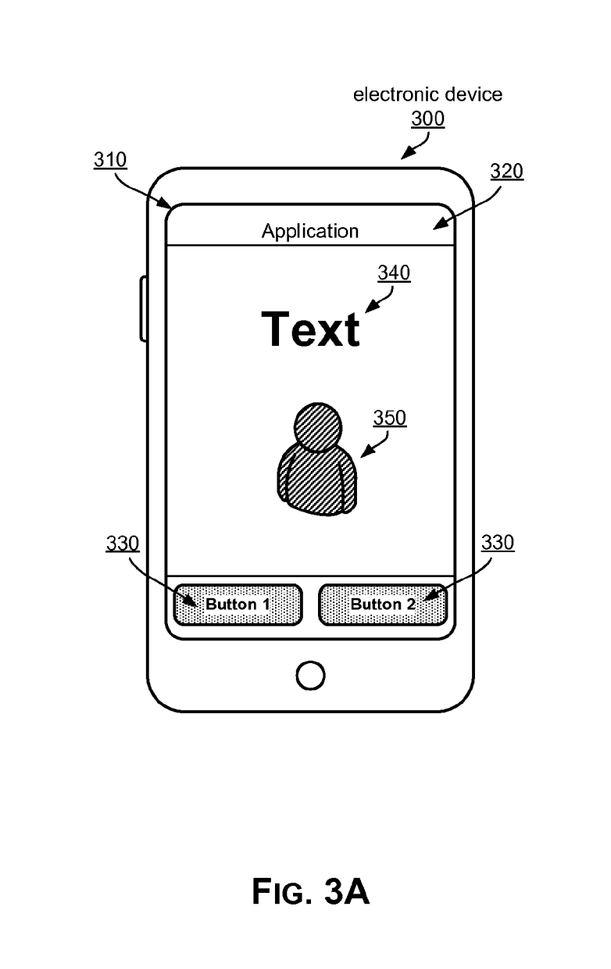
FIGS. 3A-3B are block diagrams illustrating automatic contrast adjustments in an electronic device based on variations in ambient lighting conditions.
Figure 3B:
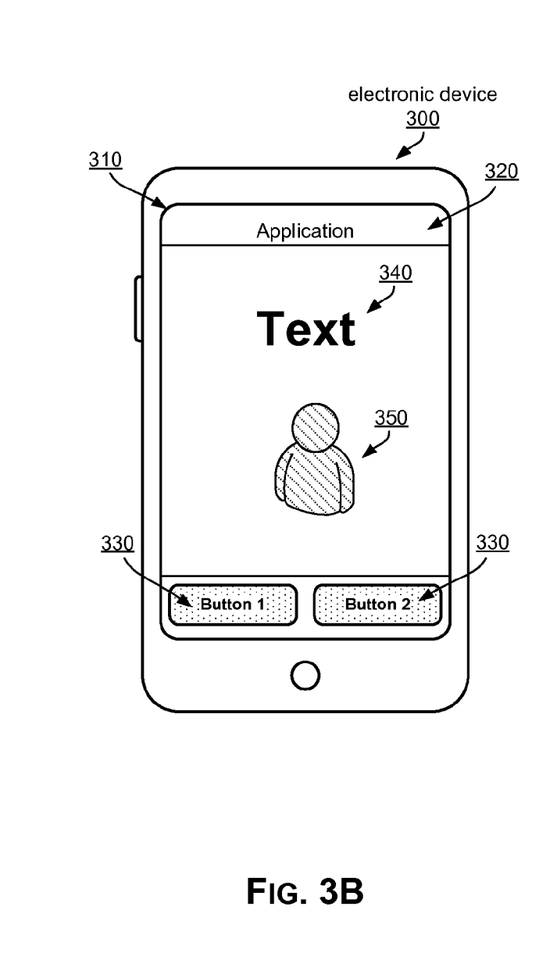

FIGS. 3A-3B are block diagrams illustrating automatic contrast adjustments in an electronic device based on variations in ambient lighting conditions. Referring to FIGS. 3A-3B, there is shown an electronic device 300, which may be operable to provide adaptive contrast/brightness adjustment based on ambient lighting conditions (or changes therein). The electronic device 300 may be substantially similar to the electronic device 200, as described with respect to FIG. 2, for example. In this regard, the electronic device 300 may comprise (as integrated component or external, auxiliary component) a display 310.

As shown in FIG. 3A, the display 310 the electronic device 300 may be used in displaying video content, which may correspond to a particular application that may be running in the electronic device 300. For example, as shown in FIG. 3A, the graphical interface (320) for the application may comprise a background area, in which text (340) and graphics (350) may be displayed. In this regard, the graphics (350) may comprise images, charts, and/or video streams. The graphical interface (320) for the application may also comprise one or more graphical buttons 330. In this regard, the buttons 330 may correspond to regions in the display 310 where button images are displayed, whereby touching this button (by device user(s)) may be interpreted as clicking of the button, indicating user selection of the action association with these buttons (330).

In some instances, the brightness of the display 310 and/or the contrast of the various components of the graphical interface (320) for the application (e.g., buttons 330, text 340, and/or graphics 350) may be configured such as to optimize viewing at particular lighting conditions, corresponding to FIG. 3A for example. In some implementations of the disclosure, the electronic device 300 may be configured to automatically adjust contrast and brightness during display operations based on changes in ambient lighting conditions, as described with respect to FIGS. 1 and 2 for example.

For example, as shown in FIG. 3B, upon change in ambient lighting conditions pertaining to the electronic device 300, adjustments to contrast and brightness that may be applied to the display 310 of the electronic device 300. In this regard, in addition to selecting different brightness level for the display 310, the contrast applicable to the graphical interface (320) displayed via the display 310 may also be adjusted. The contrast adjustment may comprise changes to sharpness and/or color applicable to one or more of the various components of the graphical interface (320)—e.g., buttons 330, text 340, and/or graphics 350—as shown in FIG. 3B (relative to the corresponding components in FIG. 3A).

Figure 4:
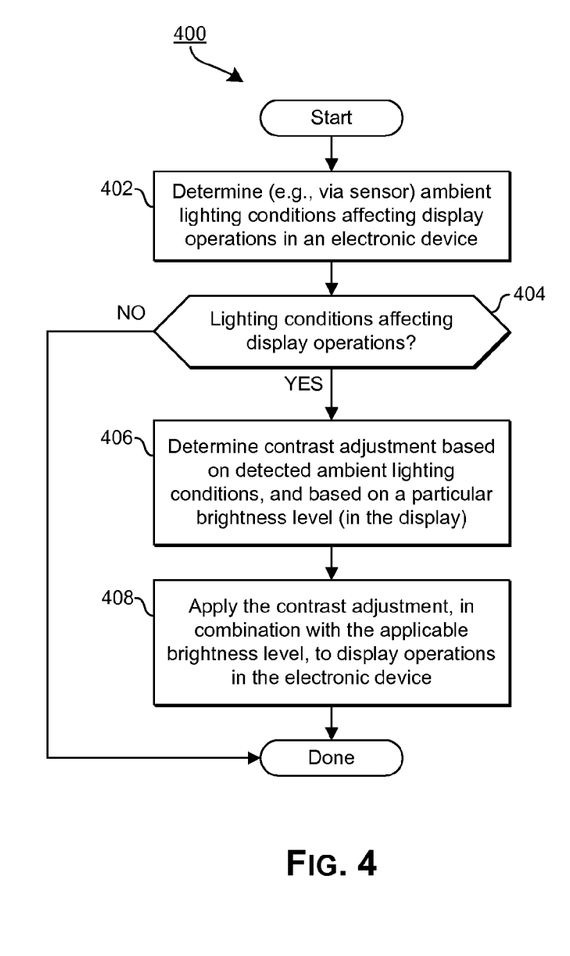
FIG. 4 is a flow chart that illustrates adaptive contrast adjustments based on variations in ambient lighting conditions.

FIG. 4 is a flow chart that illustrates adaptive contrast adjustments based on variations in ambient lighting conditions. Referring to FIG. 4, there is shown a flow chart 400 comprising a plurality of steps for performing adaptive contrast adjustments in a device, such as the electronic device 200, based on variations in ambient lighting conditions, to enhance readability for example.

In step 402, the ambient lighting conditions, which may affect display operations in an electronic device (e.g., device 200) may be determined. For example, light sensor(s) may be utilized to detect ambient lighting conditions. In step 404, it may be determined whether the detected ambient lighting conditions affect display operations. For example, the determination of the effect on display operations may be based on readability of text (or other content such as video). In instances where it may be determined that the detected ambient lighting conditions do not affect display operations, the process may terminate.

Returning to step 404, in instances where it may be determined that the detected ambient lighting conditions may affect display operations, the process may proceed to step 406. In step 406, contrast adjustment may be determined based on detected ambient lighting conditions, and/or based on a particular brightness level (in the display). For example, the selection of the contrast adjustment may be based on mapping tables, substantially as described with respect to FIG. 1 for example. In step 408 the contrast adjustment, may be applied in combination with the applicable brightness level, to display operations in the electronic device. In this regard, the contrast adjustments may be applied directly to the display operations (e.g., applied to graphics/video rendering functions or operations) and/or indirectly, such as by adjusting video content generation functions (e.g., applications modifying text and/or graphics colors).

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for improving screen readability in daylight with runtime color adjustment.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed:

1. A method, comprising:
   in an electronic device:
   determining ambient lighting conditions;
   determining when the ambient lighting conditions affect display operations in the electronic device;
   when the ambient lighting conditions affect display operations in the electronic device, adjusting display operations in the electronic device, the adjusting comprising:
   applying to a display of the electronic device, a particular brightness level that is selected based on the determined ambient lighting conditions; and
   applying, in combination with the particular brightness level applied to the display of the electronic device, a particular contrast level selected based on the determined ambient lighting conditions, wherein applying the selected contrast level comprises adjusting or modifying a contrast of video content outputted via the display; and
   applying contrast adjustments corresponding to the selected contrast level during generation and/or creation of the video content, and wherein applying the contrast adjustments during the generation and/or creation of the video content comprises adjusting text color selection.

2. The method of claim 1, comprising selecting the selected contrast level based on the applicable brightness level.

3. The method of claim 1, wherein applying the selected contrast level comprises color and/or sharpness adjustments.

4. The method of claim 1, comprising applying contrast adjustments corresponding to the selected contrast level during graphics and/or video processing performed in the electronic device during display operations.

5. The method of claim 1, comprising adjusting graphics and/or video processing performed in the electronic device during display operations based on the selected contrast level.

6. The method of claim 5, wherein the configuring of graphics and/or video processing operations comprising adjusting distortion related processing to account for changes caused by the selected contrast level.

7. The method of claim 1, comprising configuring and/or modifying one or both of contrast and/or brightness levels in the electronic device based on user input.

8. A system, comprising:
   an electronic device operable to:
   determine ambient lighting conditions;
   determine when the ambient lighting conditions affect display operations in the electronic device;
   when the ambient lighting conditions affect display operations in the electronic device, adjusting display operations in the electronic device, the adjusting comprising:
   applying to a display of the electronic device, a particular brightness level that is selected based on the determined ambient lighting conditions; and
   applying, in combination with the particular brightness level applied to the display of the electronic device, a particular contrast level selected based on the determined ambient lighting conditions, wherein applying the selected contrast level comprises adjusting or modifying a contrast of video content outputted via the display; and
   apply contrast adjustments corresponding to the selected contrast level during generation and/or creation of the video content, and wherein applying the contrast adjustments corresponding to the selected contrast level during generation and/or creation of the video content comprising adjusting text color selection.

9. The system of claim 8, wherein the electronic device is operable to select the selected contrast level based on the applicable brightness level.

10. The system of claim 8, wherein applying the selected contrast level comprises color and/or sharpness adjustments.

11. The system of claim 8, wherein the electronic device is operable to apply the contrast adjustments corresponding to the selected contrast level during graphics and/or video processing performed in the electronic device during display operations.

12. The system of claim 8, wherein the electronic device is operable to adjust graphics and/or video processing performed in the electronic device during display operations based on the selected contrast level.

13. The system of claim 12, wherein the configuring of graphics and/or video processing operations comprising adjusting distortion related processing to account for changes caused by the selected contrast adjustment.

14. The system of claim 8, wherein the electronic device is operable to configure and/or modify one or both of contrast and/or brightness levels in the electronic device based on user input.

15. A method, comprising:
   in an electronic device:
   determining ambient lighting conditions;
   determining when the ambient lighting conditions affect display operations in the electronic device;
   when the ambient lighting conditions affect display operations in the electronic device, adjusting display operations in the electronic device, the adjusting comprising:
   applying to a display of the electronic device, a particular brightness level that is selected based on the determined ambient lighting conditions; and
   applying, in combination with the particular brightness level applied to the display of the electronic device, a particular contrast level selected based on the determined ambient lighting conditions, wherein applying the selected contrast level comprises adjusting or modifying a contrast of video content outputted via the display; and
   adjusting graphics and/or video processing during display operations based on the selected contrast level, wherein the adjusting of graphics and/or video processing operations comprises adjusting distortion related processing to account for changes caused by the selected contrast level.

16. The method of claim 1, comprising selecting the selected contrast level based on the applicable brightness level.

17. The method of claim 1, wherein applying the selected contrast level comprises color and/or sharpness adjustments.

18. The method of claim 1, comprising applying contrast adjustments corresponding to the selected contrast level during graphics and/or video processing performed in the electronic device during display operations.

19. The method of claim 1, comprising applying contrast adjustments corresponding to the selected contrast level during generation and/or creation of the video content.

20. The method of claim 19, wherein applying the contrast adjustments during the generation and/or creation of the video content comprises adjusting text color selection.

21. The method of claim 6, wherein the distortion related processing comprises anti-aliasing processing.

22. The method of claim 1, comprising configuring and/or modifying one or both of contrast and/or brightness levels in the electronic device based on user input.

23. A system, comprising:
an electronic device operable to:
determine ambient lighting conditions;
determine when the ambient lighting conditions affect display operations in the electronic device;
when the ambient lighting conditions affect display operations in the electronic device, adjusting display operations in the electronic device, the adjusting comprising:
applying to a display of the electronic device, a particular brightness level that is selected based on the determined ambient lighting conditions; and
applying, in combination with the particular brightness level applied to the display of the electronic device, a particular contrast level selected based on the determined ambient lighting conditions, wherein applying the selected contrast level comprises adjusting or modifying a contrast of video content outputted via the display; and
adjust graphics and/or video processing performed in the electronic device during display operations based on the selected contrast level, and wherein the adjusting of graphics and/or video processing operations comprising adjusting distortion related processing to account for changes caused by the selected contrast adjustment.

24. The system of claim 8, wherein the electronic device is operable to select the selected contrast level based on the applicable brightness level.

25. The system of claim 8, wherein applying the selected contrast level comprises color and/or sharpness adjustments.

26. The system of claim 8, wherein the electronic device is operable to apply the contrast adjustments corresponding to the selected contrast level during graphics and/or video processing performed in the electronic device during display operations.

27. The system of claim 8, wherein the electronic device is operable to apply the contrast adjustments corresponding to the selected contrast level during generation and/or creation of the video content.

28. The system of claim 27, wherein applying the contrast adjustments corresponding to the selected contrast level during generation and/or creation of the video content comprising adjusting text color selection.

29. The system of claim 13, wherein the distortion related processing comprises anti-aliasing processing.

30. The system of claim 8, wherein the electronic device is operable to configure and/or modify one or both of contrast and/or brightness levels in the electronic device based on user input.

* * * * *